United States Patent [19]
Braig et al.

[11] Patent Number: 5,726,225
[45] Date of Patent: Mar. 10, 1998

[54] CORROSION INHIBITORS IN POWDER COATINGS

[75] Inventors: Adalbert Braig, Binzen, Germany; Hugh Stephen Laver, Reinach, Switzerland

[73] Assignee: Ciba Specialty Chemicals Corporation, Tarrytown, N.Y.

[21] Appl. No.: 662,736

[22] Filed: Jun. 10, 1996

[30] Foreign Application Priority Data

Jun. 14, 1995 [CH] Switzerland ............... 1765/95

[51] Int. Cl.$^6$ ............... C08K 5/46; C08K 5/35
[52] U.S. Cl. ............... 524/83; 524/93; 524/95; 524/456
[58] Field of Search ............... 524/83, 93, 95, 524/456

[56] References Cited

U.S. PATENT DOCUMENTS

| | | | |
|---|---|---|---|
| 4,612,049 | 9/1986 | Berner et al. | 106/14.13 |
| 4,696,763 | 9/1987 | Bentley et al. | 252/391 |
| 5,073,579 | 12/1991 | Macholdt et al. | 524/255 |
| 5,153,252 | 10/1992 | Skora | 524/372 |

FOREIGN PATENT DOCUMENTS

| | | |
|---|---|---|
| 2147479 | 5/1994 | Canada . |
| 0046057 | 2/1982 | European Pat. Off. . |
| 0128862 | 12/1984 | European Pat. Off. . |
| 0161219 | 11/1985 | European Pat. Off. . |
| 0170356 | 2/1986 | European Pat. Off. . |
| 0122781 | 10/1986 | European Pat. Off. . |
| 03060422 | 3/1990 | European Pat. Off. . |
| 0371528 | 6/1990 | European Pat. Off. . |
| 0389080 | 9/1990 | European Pat. Off. . |
| 0471409 | 2/1992 | European Pat. Off. . |
| 3737495 | 5/1989 | Germany . |
| 4237594 | 5/1994 | Germany . |
| 9114745 | 10/1991 | WIPO . |
| 9200342 | 1/1992 | WIPO . |
| 921130 | 7/1992 | WIPO . |
| 9403545 | 2/1994 | WIPO . |

OTHER PUBLICATIONS

Grace, Material Safety Data Sheet, Shieldex, Aug. 1986.
Grace, Shieldex, pp. 1–16 (1986).
T. FLetcher, Phänomen Farbe, vol. 13, pp. 26–28 (1993).
Anti–Corrosion Filiform Corrosion on Architectural Aluminum—A Review, Mar. 1994, vol. 184, pp. 90–95.
Ullmann's Encyclopedia of Industrial Chemistry, 5th Ed., vol. A18, pp. 438–444.
Haagen et al, Farbe und. Lack. vol. 96, pp. 509–513, (1990).

*Primary Examiner*—Kriellion S. Morgan
*Attorney, Agent, or Firm*—David R. Crichton; Victoria M. Malia

[57] ABSTRACT

A description is given of powder coating compositions comprising
a) an organic film-forming binder, and
b) as corrosion inhibitor i) at least one compound of the formula I

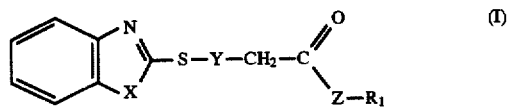

in which
$R_1$ is hydrogen, $C_1$–$C_{12}$alkyl or $C_5$–$C_8$cycloalkyl,
X is oxygen, sulfur or —NH—,
Y is a direct bond, methylene,

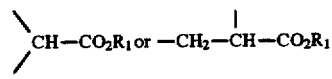

and
Z is oxygen or

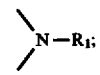

and ii) at least one calcium-modified silicate pigment.

15 Claims, No Drawings

CORROSION INHIBITORS IN POWDER COATINGS

The present invention relates to powder coating compositions comprising an organic film-forming binder and, as corrosion inhibitor, a mixture consisting of at least two different types of corrosion inhibitor, and to the use thereof for protecting metallic surfaces.

The use of heterocyclic carboxylic acids and their salts as corrosion inhibitors in coating compositions is known and is described, for example, in U.S. Pat. No. 4,612,049.

The use of anticorrosion pigments, such as, for example, calcium-modified silicate pigment, is known and is described, for example, in: EP-A-0 046 057; safety data sheet from Grace GmbH in Worms (Germany) for Shieldex® of 4 Aug., 1986; sales brochure from Grace GmbH in Worms (Germany) for Shieldex®, pages 1–16 (1986); or T. Fletcher, Phänomen Farbe 13 (12), pages 26–28 (1993).

Powder coating is a known technology and is described, for example, in DE-A-4 237 594; WO-A-94/03545; U.S. Pat. No. 5,153,252; WO-A-92/11307; EP-A-0 471 409; WO-A-92/00342; WO-A-91/14745; EP-A-0 389 080; EP-A-0 371 528 or DE-A-3 737 495. In general, powder coating comprises the fluidization of a powder, with the supply of air, its electrostatic charging and its application to an earthed, preferably metallic substrate. The substrate is subsequently heated, and the adhering powder melts, coalesces and forms a coherent film on the metal surface. Since powder coating does not involve the use of solvents, this technology is particularly environment-friendly.

It has now been found that a mixture of two different types of corrosion inhibitor is particularly suitable as corrosion inhibitor in powder coating compositions for protecting metallic surfaces. These corrosion inhibitor mixtures in powder coatings inhibit in particular the filiform corrosion on metallic substrates such as, for example, aluminium. The problem of filiform corrosion on metal substrates, such as, for example, aluminium, coated with organic substances is known and is described, for example, by H. Haagen et al., Farbe und Lack 96, 509–513 (1990) or G. Steele, Polymers Paint Colour Journal, 184, 90–95 (1994). The individual corrosion inhibitors, in powder coatings, provide either no protection, or a level of protection which is inadequate for practical purposes, of the metal surface against filiform corrosion. The novel corrosion inhibitor mixture in powder coatings leads to corrosion protection of the metallic surface without laborious pretreatment of the metal, for example zinc phosphatizing, chromatizing or anodization. The use of chromate-containing pigments, for example strontium chromate, or of zinc dust in the powder coating can be omitted.

The present invention therefore provides powder coating compositions comprising a) an organic film-forming binder, and b) as corrosion inhibitor i) at least one compound of the formula I

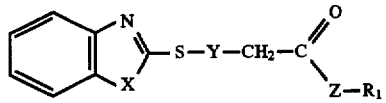 (I)

in which $R_1$ is hydrogen, $C_1$–$C_{12}$alkyl or $C_5$–$C_{12}$cycloalkyl,

X is oxygen, sulfur or —NH—,

Y is a direct bond, methylene,

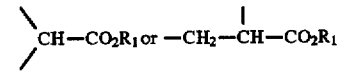

and

Z is oxygen or

and ii) at least one calcium-modified silicate pigment.

Alkyl having up to 12 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl or 1,1,3,3,5,5-hexamethylhexyl. A preferred definition of $R_1$ is, for example, $C_1$–$C_{10}$alkyl, especially $C_1$–$C_8$alkyl, for example $C_1$–$C_6$alkyl. A particularly preferred definition of $R_1$ is, for example, $C_1$–$C_4$alkyl, especially methyl or ethyl.

$C_5$–$C_{12}$cycloalkyl is for example cyclopentyl, cyclohexyl, cycloheptyl, cyclooctyl, cyclodecyl or cyclododecyl. Preference is given, for example, to $C_5$–$C_8$cycloalkyl, especially $C_5$–$C_7$cycloalkyl, for example cyclohexyl.

Powder coatings which merit interest are those comprising as component (i) at least one compound of the formula I in which X is sulfur.

Preference is given to powder coatings comprising as component (i) at least one compound of the formula I in which $R_1$ is hydrogen and Z is oxygen.

Preference is also given to powder coatings comprising as component (i) at least one compound of the formula I in which Y is

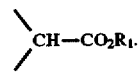

Preference is likewise given to powder coatings comprising as component (i) at least one compound of the formula I in which $R_1$ is hydrogen, $C_1$–$C_8$alkyl or $C_5$–$C_8$cycloalkyl, X is oxygen or sulfur, Y is a direct bond, methylene,

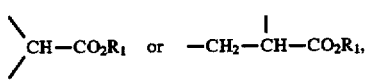

and

Z is oxygen.

Likewise meriting interest are powder coatings comprising as component (i) at least one compound of the formula I in which $R_1$ is hydrogen, X is sulfur, Y is a direct bond, methylene,

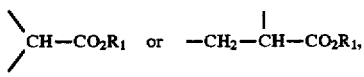

and

Z is oxygen.

Particular interest attaches to powder coatings comprising as component (i) at least one compound of the formula I in which $R_1$ is hydrogen,
X is sulfur,
Y is

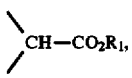

and

Z is oxygen.

Very particularly preferred powder coatings are those comprising as component (i) at least one compound of the formula Ia, Ib, Ic or Id

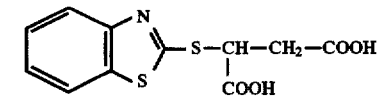 (Ia)

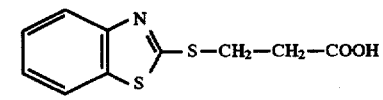 (Ib)

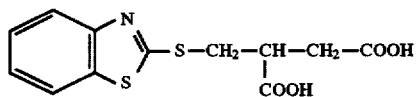 (Ic)

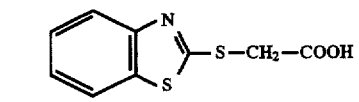 (Id)

Interest attaches to powder coatings comprising as component (ii) at least one calcium-modified silicate pigment in which the calcium content is from 2 to 7% by weight.

The compounds of the formula I are known and their preparation is described, for example, in U.S. Pat. No. 4,612,049.

The preparation of calcium-modified silicate pigment is known and is described, for example, in EP-A-0 046 057; safety data sheet from Grace GmbH in Worms (Germany) for Shieldex® of 4 Aug., 1986; sales brochure from Grace GmbH in Worms (Germany) for Shieldex®, pages 1–16 (1986); or T. Fletcher, Phänomen Farbe 13 (12), pages 26–28 (1993). Calcium-exchanged aluminium silicates are also suitable.

Particular preference is given to the calcium-modified silicate pigments from Grace GmbH (Germany) which are obtainable under the trade name Shieldex®. These are synthetic amorphous silicates loaded by ion exchange technology with calcium. Examples are Shieldex® AC3, Shieldex® AC5 or Shieldex® CP4.

Consequently, other powder coatings of specific interest are those comprising as component (ii) at least one calcium-modified silicate pigment from the Shieldex® product range from Grace GmbH (Germany).

The definition of "powder coatings" is understood to be that as described in Ullmann's Encyclopedia of Industrial Chemistry, 5th, Completely Revised Edition, Vol. A 18, pages 438 to 444 (1991) in Section 3.4. Powder coatings are understood as thermoplastic or stovable, crosslinkable polymers which are applied in powder form to predominantly metallic substrates. The manner in which the powder is brought into contact with the workpiece to be coated characterizes the various application techniques, such as, for example, electrostatic powder spraying, electrostatic fluidized-bed sintering, bed sintering, fluidized-bed sintering, rotational sintering or centrifugal sintering.

Preferred organic film-forming binders for the powder coating composition according to the invention are stoving systems based on, for example, epoxy resins, polyester resins, epoxy-polyester resins, polyester-triglycidyl isocyanurate resins, polyurethane resins, polyester-polyurethane resins, acrylate resins or mixtures of such resins. Also of interest are film-forming binders with thermoplastic properties, examples being polyethylene, polypropylene, polyamides, polyvinyl chloride, polyvinylidene dichloride or polyvinylidene difluoride. Furthermore, powder coatings are also known which comprise ethylenically unsaturated components and can be cured with photoinitiators.

Preference is given to powder coating compositions in which component (a) is an ethylenically unsaturated component which can be cured in the presence of a photoinitiator with light, especially ultraviolet light. Examples of appropriate light sources are medium-pressure or high-pressure mercury lamps.

Polyesters are in general hydroxy-functional or carboxy-functional and are commonly prepared by condensation of diols and dicarboxylic acids. By adding polyols and/or polyacids, branched polyesters are obtained which then, on stoving in the presence of crosslinking agents, give rise to network structures which give the coating the desired physical properties, such as scratch resistance, impact resistance and flexural strength. In place of polyfunctional acids it is also possible to use anhydrides or acid chlorides, for example maleic anhydride, itaconic anhydride, phthalic anhydride, terephthalic anhydride, hexahydroterephthalic anhydride, trimellitic anhydride, pyromellitic dianhydride, succinic anhydride, etc. It is also possible to use simple esters, for example dimethyl terephthalate, in which case polymerization takes place by transesterification with elimination of the volatile alcohol. Likewise practicable is preparation by combination of transesterification and condensation. Furthermore, polyesters can be prepared by polycondensation of hydroxycarboxylic acids, for example 12-hydroxystearic acid and hydroxypivalic acid, or of the corresponding lactones, for example ε-caprolactone. Examples of dicarboxylic acids and polyacids include terephthalic acid, isophthalic acid, adipic acid, azelaic acid, sebacic acid, 1,12-dodecanedioic acid, pyromellitic acid, 3,6-dichlorophthalic acid, succinic acid, 1,3-cyclohexanedicarboxylic acid and 1,4-cyclohexanedicarboxylic acid. Examples of diols and polyols include ethylene glycol, propylene glycol, glycerol, hexanetriol, hexane-2,5-diol, hexane-1,6-diol, pentaerythritol, sorbitol, neopentylglycol, trimethylolethane, trimethylolpropane, tris-1,4-cyclohexanedimethanol, trimethylpentanediol, 2,2-diethyl-1,3-propanediol, 2-methyl-2-butyl1,3-propanediol, ester diol 204 (ester of hydroxypivalic acid and neopentylglycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol,2-butyne-1,4-diol or 2-methyl-1,3-propanediol.

Suitable crosslinking agents for carboxy-functional polyesters are epoxy compounds, such as, for example, novolak-epoxy resins, diglycidyl ethers of bisphenol A, hydrogenated bisphenol A, and bisphenol A modified by reaction with, for example, aliphatic dicarboxylic acids. Also suitable are reactive epoxy compounds, such as triglycidyltriazolidine-3,5-dione, the glycidyl esters of polyacids, for example diglycidyl terephthalate and diglycidyl hexahydroterephthalate, hydantoin epoxides (U.S. Pat. No. 4,402,983) and, very particularly, triglycidyl isocyanurate and Araldit® PT910 (Ciba-Geigy). Other crosslinking agents for carboxy-functional polyesters are β-hydroxyalkylamides (U.S. Pat. No. 4,076,917), for example the predominantly tetrafunctional β-hydroxyalkylamide derivative of adipic acid (Primid® XL552 from Rohm & Haas). Others which have proven suitable include derivatives of melamine, benzoguanimine and glycoluril, which are, alkylated with low molecular weight alcohols. Examples are tetramethylmethoxyglycoluril (Powderlink® 1174 from American Cyanamid). Other known cross-linking agents are bis- and trisoxazolidines, for example 1,4-bisoxazolidinobenzene. In comparison with systems crosslinked using tetramethylmethoxyglycoluril or β-hydroxyalkylamide derivatives of adipic acid, coatings containing triglycidyl isocyanurate as crosslinking agent are of greater corrosion resistance. The former systems tend to be less corrosion-resistant, which is possibly a result of the hydrophilicity of the crosslinking agent. In such systems, the compounds of the present invention are of particular interest as corrosion inhibitors.

A recent development comprises carboxy-functional polyesters which contain chemically bonded epoxy groups and are consequently able to crosslink with themselves (Molhoek et al., 22nd Fatipec Congress, 15.-19.5.95, Budapest, Vol. 1, 119–132).

In all systems in which an epoxy group or a glycidyl radical reacts with a carboxyl group or an anhydride in a crosslinking reaction, catalysts can be employed. Examples are amines or metal compounds, for example aluminium acetylacetonate or tin octoate.

As crosslinking agents for hydroxyfunctional polyesters, the polyisocyanate crosslinkers are of particular importance. In order to prevent premature crosslinking because of the high reactivity of isocyanates, and in order to obtain good levelling of the melted powder, the polyisocyanates are blocked (internally as a uretdione or as an adduct with a blocking agent). The most frequently employed blocking agents are ε-caprolactam, methyl ethyl ketoxime or butanoneoxime. Other suitable blocking agents for isocyanates are described in the publications of G. B. Guise, G. N. Freeland and G. C. Smith, J. Applied Polymer Science, 23, 353 (1979) and of M. Bock and H.-U. Maier-Westhues in "Progress in Product Development for Powder Coating Technology", XIX th Int. Conf. on Organic Coatings, Science and Technol., Athens, 12–16 Jul., 1993. Examples of blocked or unblocked polyisocyanates include 2-methylpentane-1,5-diisocyanate, 2-ethylbutane-1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl)benzene, 4,4'-diisocyanatodicyclohexylmethane, 1,4-bis-(isocyanatomethyl)cyclohexane, m-tetramethylxylene diisocyanate, p-tetramethylxylene diisocyanate and, in particular, isophorone diisocyanate. For the purpose of deblocking, a metallic catalyst, for example tin octoate, dibutyltin oxide or dibutyltin dilaurate, is usually added to the polyisocyanate formulation.

Other crosslinking agents suitable for hydroxy-functional polyesters are anhydrides, for example trimellitic anhydride and its reaction products with diols and diamines. Further examples of such crosslinking agents are described by T. A. Misev in "Powder Coatings: Chemistry and Technology", J. Wiley & Sons, Chichester on pages 123 and 124.

Polyacrylates, which usually have hydroxy, carboxy or glycidyl functionality, are also employed as binders for powder coatings. They are prepared by the customary methods, predominantly from monomers such as styrene and linear or branched $C_1$–$C_8$ alkyl esters of acrylic acid or methacrylic acid. Other ethylenically unsaturated compounds, for example divinylbenzene, acrylamide, methacrylamide, butoxymethylacrylamide, acrylonitrile, butadiene, etc., can also be added and copolymerized. Hydroxy functionality is provided by the copolymerization of hydroxy-functional monomers such as, for example, hydroxyethyl acrylate, hydroxyethyl methacrylate, hydroxypropyl acrylate and hydroxypropyl methacrylate. For carboxy functionality, ethylenically unsaturated acids and anhydrides, for example acrylic acid, methacrylic acid, itaconic acid, crotonic acid, maleic anhydride, itaconic anhydride, acrylic anhydride or methacrylic anhydride are used (U.S. Pat. No. 3,836,604). Glycidyl functionality is provided, as taught in EP-A-0 256 369 and U.S. Pat. No. 3,876,578, by the copolymerization of monomers such as glycidyl acrylate and glycidyl methacrylate. As crosslinking agents for polyacrylates with hydroxy or carboxy functionality it is in principle possible to use the same compounds as already described for the polyesters with hydroxy or carboxy functionality. Further suitable crosslinking agents are the epoxy compounds of U.S. Pat. No. 0,045,040. Suitable crosslinking agents for polyacrylates with glycidyl functionality are dicarboxylic acids such as, for example, sebacic acid and 1,12-dodecanedioic acid, and anhydrides, for example bis-trimellitic anhydride and the compounds described in U.S. Pat. No. 3,880,946. Also known, furthermore, are autocrosslinking polyacrylates, from DE-A-3 310 545.

Epoxy resins for powder coatings are mostly either novolak-epoxy resins or, in particular, those based on aromatic polyols, especially on bisphenols such as bisphenol A. Also known are modified bisphenol-epoxy resins from JP-A-58 187 464 (1982). The epoxy resins are employed in combination with crosslinking agents from the classes of the solid aliphatic amines, solid aromatic amines, amine adducts, phenolic resins, polyacids and the already described carboxyfunctional polyesters. Hardeners (curing agents) meriting special mention are the dicyandiamides, which are frequently employed together with a catalyst such as, for example, Lewis acids, boron trifluoride amine complexes, metal complexes, tertiary or quaternary amines, and imidazoline derivatives such as 2-methylimidazoline.

The powder coating compositions can in addition comprise one or more components from the group consisting of pigments, dyes, fillers, levelling assistants, degassing agents, charge control agents, optical brighteners, adhesion promoters, antioxidants, light stabilizers, curing catalysts and photoinitiators. They can also contain other known anticorrosion agents, for example anticorrosion pigments, such as phosphate- or borate-containing pigments or metal oxide pigments, or other organic or inorganic corrosion inhibitors, for example salts of nitroisophthalic acid, phosphoric esters, technical-grade amines or substituted benzotriazoles.

Suitable photoinitiators are those based on benzophenones, phenyl glyoxalates, bis- or mono-acylphosphine oxides, α-hydroxy ketones or benzyl dimethyl ketals.

The pigments are for example titanium dioxide, iron oxide, carbon black, aluminium bronze or phthalocyanine blue.

Examples of fillers are talc, alumina, aluminium silicate, barytes, mica or silica. The corrosion inhibitors can also be applied to pulverulent carrier materials.

Examples of degassing agents are fatty acid amides as described in EP-A-0 471 409, ε-caprolactam, methyl isophthalate and dimethyl isophthalate (EP-A-284 996), and especially benzoin.

Examples of levelling assistants are epoxidized fatty acids, abietyl alcohol, polylauryl methacrylate, polylauryl acrylate, polydimethylsiloxane-polyalkylene oxide block copolymers or, in particular, low molecular weight copolymers and polymers of $C_1$–$C_8$alkyl acrylate esters or alkyl methacrylate esters.

Adhesion promoters are based, for example, on modified silanes, titanates or zirconates.

It is also advantageous to add basic fillers or pigments, which in certain binder systems bring about a synergistic effect on the inhibition of corrosion. Examples of such basic fillers and pigments are calcium carbonate or magnesium carbonate, zinc oxide, zinc carbonate, zinc phosphate, magnesium oxide, alumina, aluminium phosphate, or mixtures thereof. Examples of basic organic pigments are those based on aminoanthraquinone.

In the case of the preparation of the organic film-forming binder by polymerization or polycondensation of monomers the corrosion inhibitor (i) can be admixed to the monomers even prior to polymerization.

The corrosion inhibitors (i) are expediently used in a quantity of from 0.5 to 20% by weight, preferably from 0.5 to 10% by weight, in particular from 0.5 to 5% by weight, based on the weight of the total solids of the powder coating composition.

The corrosion inhibitors (ii) are expediently used in a quantity of from 1.0 to 20% by weight, preferably from 0.5 to 15% by weight, in particular from 5.0 to 15% by weight, based on the weight of the total solids of the powder coating composition.

The weight ratio of corrosion inhibitors (i) to (ii) is expediently from 1:1 to 1:10, preferably from 1:3 to 1:6, in particular from 1:4 to 1:5.5.

The powder coating compositions are applied to the substrate by the customary methods, especially by electrostatic powder spraying. The powder sprayed out from the spray gun is electrostatically charged at a high-voltage electrode and is guided onto the workpiece by the field lines which develop between the gun and the earthed workpiece. The "wrap-around" form of the field lines ensures that undercuts and reverse faces are also coated. The particles applied, which adhere by means of Coulomb forces, are melted together in an oven and cured. The preferred stoving temperatures are between 140° and 230° C., in particular from 140° to 220° C.

In the case of UV-curable systems, after application to the substrate the powder coating composition according to the invention is first melted or heated, expediently using infrared, to a temperature of from 50° to 140° C. Subsequently, the coating is cured with UV light while still hot.

Preferred substrates are metallic substrates such as, for example, those of iron, steel, copper, zinc, tin, magnesium, silicon, titanium or aluminium, and alloys thereof. Aluminium and its alloys are of particular interest.

The stoving temperatures of powder coatings are in some cases higher than the decomposition temperatures of the corrosion inhibitor compounds of the formula I, a consequence of which is that the activity of the compounds of the formula I [in the absence of component (ii)] as corrosion inhibitors is lost. It is therefore surprising that the novel corrosion inhibitor mixture comprising components (i) and (ii) does not lose its anticorrosive action at these high stoving temperatures.

A preferred embodiment of the present invention is therefore the use of component (b) as a corrosion inhibitor in powder coating compositions for metallic substrates.

The present invention also provides a method of protecting a corrodable metal substrate, which comprises applying to this substrate a powder coating composition comprising a) an organic film-forming binder and b) as corrosion inhibitor i) at least one compound of the formula I and ii) at least one calcium-modified silicate pigment, and then curing it. A particularly preferred method is that in which the corrodable metal substrate is aluminium.

A further subject of the invention also relates to a coating film which is applied to a metal substrate and cured by the above method.

The preparation of a powder coating with the novel compounds can be carried out in accordance with the customary methods. A good description of the procedures and machinery can be found in T. A. Misev's book: "Powder Coatings: Chemistry and Technology", J. Wiley & Sons, Chichester in Chapter 5.

In general, all of the components of the powder coating composition are weighed out and mixed together in an appropriate mixer. Mixers used for this purpose are tumble mixers, cone mixers, double-cone mixers, horizontal mixers, blenders and stirring units such as planetary mixers. It is particularly advantageous if the novel corrosion inhibitor mixture of components (i) and (ii) is mixed thoroughly in a mixer, for example in a ball mill or on a roller gear table, prior to use in the powder coating composition.

The formulation is first of all processed in a heated extruder in order to obtain a melted mass of maximum homogeneity. Apparatus suitable for this includes single-screw co-compounders, twin-screw extruders and planetary extruders. Addition is made in most cases by way of a screw conveyor, a conveyor belt or a shaking trough. Following extrusion the hot mass is rolled out and cooled, for example on a cooling belt. When it has solidified, the mass is crushed and then ground. Suitable grinding units are pinned-disc mills, ultracentrifugal mills, jet mills and, especially, classifying mills. The powder is subsequently classified and preferably screened, with the addition in small quantities of auxiliaries such as silica gel, for example, being possible.

Other techniques for the preparation of powder coatings (EP-B-368 851 or WO-A-92/00342) have recently been disclosed which can also be employed for this invention. In these techniques the premixed formulation or extrudate is fed to a heated rotary tube and is spun out centrifugally onto a rotary table. At the edge of the table, small, round, virtually monodisperse drops are formed which solidify in cooled air before falling to the floor.

The powder coatings are applied by the methods customary in practice. It is possible, for example, to use corona guns and also triboelectric spray guns. Also employable are all variants of the fluidized sintering method, with and without electrostatic charging. For thermoplastic powder coatings, flame spraying techniques can also be employed.

The stoving of the powder coating composition can be carried out by infrared heating, by catalytic gas burners or electrical radiators. Gas-fired and electric ovens can also be employed, and also all combinations together with infrared heating. The coatings can also be cured photochemically using IR and/or UV light. A further method of interest is the curing of the coatings through a combination of infrared heating and electron beams.

The examples which follow illustrate the invention in more detail. Parts and percentages are by weight.

EXAMPLE 1

Filiform corrosion testing of the novel corrosion inhibitor mixture in powder coatings based on polyester/triglycidyl isocyanurate, in accordance with DIN 65 472.

For the preparation of the polyester/triglycidyl isocyanurate-based powder coating composition, components 1 to 5 (formulation without additives) and, respectively, components 1 to 7 (formulation comprising the corrosion inhibitors) are employed in the stated sequence (cf. Table 1 ). When the novel corrosion inhibitor mixtures (components 6 and 7) are used, they are expediently first mixed with one another before being added to the mixture of components 1 to 5.

TABLE 1

Powder coating composition based on polyester/triglycidyl isocyanurate

| Components | Examples (Quantities in grams) | | | |
|---|---|---|---|---|
| | 1a | 1b | 1c | 1d |
| 1. Polyester (Crylcoat ® 430)[a] | 1105 | 1141 | 1241 | 1288 |
| 2. Polyester (Crylcoat ® 108)[b] | 111 | 114 | 124 | 129 |
| 3. TGIC[c] | 91.5 | 94.5 | 102.7 | 106.7 |
| 4. Benzoin[d] | 2.66 | 2.75 | 2.99 | 3.10 |
| 5. Titanium dioxide Type 2160[e] | 666 | 581 | 289 | 178 |
| 6. Compound of the formula Ia (Irgacor ® 252)[f] | — | 41 | — | 43.3 |
| 7. Calcium-modified silicate pigment[g] | — | — | 212 | 223.7 |

[a]Polyester Crylcoat ® 430 from UCB S.A.
[b]Polyester Crylcoat ® 108 from UCB S.A.
[c]Triglycidyl isocyanurate (TGIC), Araldit ® PT810 from Ciba-Geigy AG.
[d]Benzoin from Fluka AG.
[e]Titanium dioxide from Kronos.
[f](2-Benzothiazolylthio)succinic acid, Irgacor ® 252 from Ciba-Geigy AG.
[g]Calcium-modified silicate pigment, Shieldex ® CP4 from Grace GmbH.

The corrosion inhibitors or corrosion inhibitor mixtures are used in volumewise substitution for the titanium dioxide.

The components thus weighed in are mixed using a planetary stirrer. The mixture is then extruded on a Buss PLK 46L Kokneter (co-compounder) at 125 rpm (zone 1: 40° C., zone 2: 80° C.) and the extruded mass is rolled out. The powder coating composition is coarsely comminuted with a bench cutter and is ground in a Retsch ZM-1 ultracentrifugal mill with a 0.25 mm annular-perforation screen at speed level 2. The powder is finally screened through a 90 µm screen on a centrifugal screening machine.

The finished powder coating composition is electrostatically sprayed onto untreated aluminium test panels from Q-Panel using an ESB-Wagner corona cup gun and is stoved for 15 minutes at 195° C. in an electrical convection oven.

Before the filiform test, the yellowness index (YI) in accordance with ASTM D 1925–70 of the test samples is also determined. Low YI values denote little discoloration, high YI values severe discoloration of the samples. The lower the discoloration the lower the decomposition of the corrosion inhibitor during stoving. The results are compiled in Table 2.

TABLE 2

| Examples | Yellowness Index (ASTM D 1925-70) |
|---|---|
| Example 1a | −0.95 |
| Example 1b | +0.38 |
| Example 1c | −1.05 |
| Example 1d | −0.89 |

Before the beginning of weathering, a scratching tool is used to make two 50 mm long scratch tracks, which extend into the plating, in the 60 to 65 µm thick films on the sample panel. One scratch track is made parallel to the long side of the panel, with the second scratch track being made transversely to the long side. The distance of the scratch tracks from the outer edges of the sample panel and between one another is at least 10 mm.

Filiform corrosion is initiated in accordance with DIN 65 472 by the action of hydrochloric acid vapour over a period of one hour. The sample panels thus treated are subsequently subjected for 750 hours to rapid weathering in a climatically controlled cabinet at 40°±2° C. and 82±3% relative atmospheric humidity. The results are compiled in Table 3. The evaluation of the results is in accordance with DIN 65 472. The extent of filiform corrosion is indicated by a letter (m) and a character ($\natural$) for the number of threads per scratch track. The maximum thread length in mm is also measured. The smaller the figures, the better the protection against corrosion.

TABLE 3

| Examples | Filiform corrosion (DIN 65 472) | Maximum thread length (mm) |
|---|---|---|
| Example 1a | m 5/|5 | 5 to 6 |
| Example 1b | m 3 bis 4/|1 | <1 |
| Example 1c | m 5/|5 | 6 |
| Example 1d | no corrosion | — |

EXAMPLE 2

Filiform corrosion testing of the novel corrosion inhibitor mixture in powder coatings based on an unsaturated polyester resin which is cured with a photoinitiator and light To prepare the powder coating composition, components 1 to 6 (formulation without additives) and, respectively, components 1 to 8 (formulation comprising the corrosion inhibitors) are mixed in the stated sequence (cf. Table 4).

TABLE 4

| Components | Examples (Quantities in grams) | | | |
|---|---|---|---|---|
| | 2a | 2b | 2c | 2d |
| 1. Alfthalat ® VAN 1743[a] | 660 | 660 | 660 | 660 |
| 2. Additol ® VXL 1385[b] | 280 | 280 | 280 | 280 |
| 3. Photoinitiator[c] | 30 | 30 | 30 | 30 |
| 4. Resiflow ® PV 88[d] | 20 | 20 | 20 | 20 |
| 5. WorBe-Add ® 902[e] | 10 | 10 | 10 | 10 |
| 6. Titanium dioxide Type 2160[f] | 500 | 470 | 150 | 120 |

TABLE 4-continued

| Components | Examples (Quantities in grams) | | | |
|---|---|---|---|---|
| | 2a | 2b | 2c | 2d |
| 7. Compound of the formula Ia (Irgacor ® 252)g) | — | 30 | — | 30 |
| 8. Calcium-modified silicate pigmenth) | — | — | 160 | 160 | a) Alfthalat ® VAN 1743 is an unsaturated polyester resin from Hoechst AG.
b) Additol ® VXL 1385 is a polyurethane/polyacrylate resin from Hoechst AG.
c) The photoinitiator is a mixture of 25 parts by weight of bis(2,6-dimethoxybenzoyl)-2,4,4-trimethylpentylphosphine oxide (formula A) and 75 parts by weight of 1 benzoylcyclohexanol (formula B) from Ciba-Geigy AG.

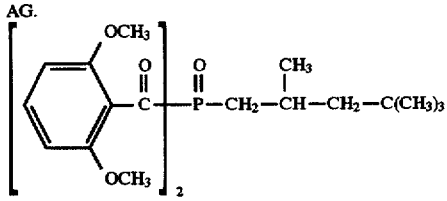

(formula A)

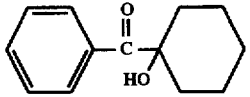

(formula B)

d) Resiflow ® PV 88 is from Worlée Chemie GmbH.
e) Worlée-Add. ® 902 is from Worlée Chemie GmbH.
f) Titanium dioxide Type 2160 is from Kronos.
g) (2-Benzothiazolylthio)succinic acid, Irgacor ® 252 from Ciba-Geigy AG.
h) Calcium-modified silicate pigment, Shieldex ® CP4 from Grace GmbH.

When the novel corrosion inhibitor mixtures (components 7 and 8) are used, they are expediently first mixed with one another before being added to the mixture of components 1 to 6.

The components thus weighed in are mixed using a planetary stirrer. The mixture is then extruded twice on a Buss PLK 46L Kokneter (co-compounder) at 125 revolutions per minute (zone 1: 40° C., zone 2: 80° C.) and rolled out. The powder coating mass is coarsely comminuted with a bench cutter and is ground in a Retsch ZM-1 ultracentrifugal mill with a 0.75 mm annular-perforation screen at speed level 2. Finally, the powder is screened through a 125 μm screen on a centrifugal screening machine.

The finished powder coating composition is electrostatically sprayed onto untreated aluminium test panels from Q-Panel using an ESB-Wagner corona cup gun at 45 kV and initially sintered at 150° C. for 2 minutes in an electrical convection oven. The coated panels are then heated at 180° C. for 5 minutes and, immediately before cooling, for the purpose of curing of the powder coating, are exposed twice at a rate of 5 m/min in an Aetek belt curing machine using 2 times 120 watt medium-pressure Hg lamps.

Before the beginning of weathering, a scratching tool is used to make two 50 mm long scratch tracks, which extend into the plating, in the 60 to 65 μm thick films on the sample panel. One scratch track is made parallel to the long side of the panel, with the second scratch track being made transversely to the long side. The distance of the scratch tracks from the outer edges of the sample panel and between one another is at least 10 mm. Filiform corrosion is initiated in accordance with DIN 65 472 by the action of hydrochloric acid vapour over a period of one hour. The sample panels thus treated are subsequently subjected to rapid weathering for 500 hours in a climatically controlled cabinet at 40°±2° C. and 82±3% relative atmospheric humidity. The results are compiled in Table 5. The evaluation of the results is in accordance with DIN 65 472. The extent of filiform corrosion is indicated by a letter (m) and a character (|) for the number of threads per scratch track. The maximum thread length in mm is also measured. The smaller the figures, the better the protection against corrosion.

TABLE 5

| Examples | Filiform corrosion (DIN 65 472) | Maximum thread length (mm) |
|---|---|---|
| Example 2a | m 5/|5 | 10 |
| Example 2b | m 5/|5 | 10 |
| Example 2c | m 3/|5 | 5 |
| Example 2d | m 2/|3 | 2 |

What is claimed is:

1. A powder coating composition comprising a) an organic film-forming binder, and b) as corrosion inhibitor i) at least one compound of the formula I

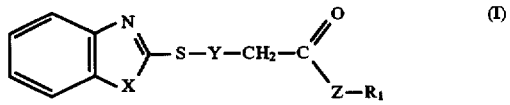

in which $R_1$ is hydrogen, $C_1$–$C_{12}$alkyl or $C_5$–$C_{12}$cycloalkyl,

X is oxygen, sulfur or —NH—,

Y is a direct bond, methylene,

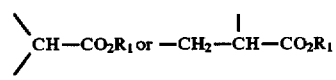

and

Z is oxygen or

and ii) at least one calcium-modified silicate pigment.

2. A powder coating composition according to claim 1, in which X is sulfur.

3. A powder coating composition according to claim 1, in which $R_1$ is hydrogen and Z is oxygen.

4. A powder coating composition according to claim 1, in which Y is

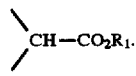

5. A powder coating composition according to claim 1, in which $R_1$ is hydrogen, $C_1$–$C_8$alkyl or $C_5$–$C_8$cycloalkyl, X is oxygen or sulfur.

Y is a direct bond, methylene,

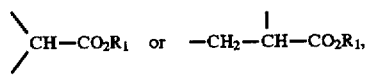

and

Z is oxygen.

6. A powder coating composition according to claim 1, in which

R₁ is hydrogen,

X is sulfur,

Y is a direct bond, methylene,

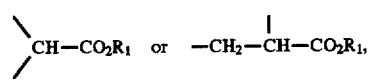

and

Z is oxygen.

7. A powder coating composition according to claim 1, in which

R₁ is hydrogen,

X is sulfur,

Y is

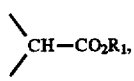

and

Z is oxygen.

8. A powder coating composition according to claim 1, in which the calcium content in the calcium-modified silicate pigment is from 2 to 7% by weight.

9. A powder coating composition according to claim 1, in which the component (a) is an epoxy resin, a polyester resin, an epoxy-polyester resin, a polyester-triglycidyl isocyanurate resin, a polyurethane resin, a polyester-polyurethane resin, an acrylate resin, an ethylenically unsaturated resin which can be cured with photoinitiators by means of light, or a mixture of such resins.

10. A powder coating composition according to claim 1, additionally comprising one or more components from the group consisting of pigments, dyes, fillers, levelling assistants, degassing agents, charge control agents, optical brighteners, adhesion promoters, antioxidants, light stabilizers, curing catalysts and photoinitiators.

11. A powder coating composition according to claim 1, in which component (i) is present in a quantity of from 0.5 to 20% and component (ii) is present in a quantity of from 1.0 to 20%, based on the weight of the total solids of the powder coating composition.

12. A powder coating composition according to claim 1, in which the weight ratio of components (i) to (ii) is from 1:1 to 1:10.

13. A method of protecting a corrodable metal substrate, which comprises applying to this substrate a powder coating composition according to claim 1 and then curing it.

14. A method according to claim 13, in which the corrodable metal substrate is aluminium.

15. A film for protecting a corrodable metal substrate, said film being formed by a process that comprises applying the powder coating composition according to claim 1 to the corrodable metal substrate and subsequently curing the applied powder coating composition.

* * * * *